(12) United States Patent
Graves et al.

(10) Patent No.: US 12,299,103 B2
(45) Date of Patent: May 13, 2025

(54) SYSTEMS AND METHODS FOR ENHANCED REAL-TIME IMAGE ANALYSIS WITH A DIMENSIONAL CONVOLUTION CONCEPT NET

(71) Applicant: Safe Tek, LLC, Monett, MO (US)

(72) Inventors: Michael Graves, Monett, MO (US); Joseph Graves, Granby, MO (US)

(73) Assignee: SAFE TEK, LLC, Monett, MO (US)

( * ) Notice: Subject to any disclaimer, the term of this patent is extended or adjusted under 35 U.S.C. 154(b) by 77 days.

(21) Appl. No.: 18/313,789

(22) Filed: May 8, 2023

(65) Prior Publication Data

US 2023/0274435 A1 Aug. 31, 2023

Related U.S. Application Data

(63) Continuation of application No. 17/697,270, filed on Mar. 17, 2022, now Pat. No. 11,663,721, which is a continuation of application No. 16/950,424, filed on Nov. 17, 2020, now Pat. No. 11,308,620, which is a continuation of application No. 16/853,031, filed on Apr. 20, 2020, now Pat. No. 10,846,857.

(51) Int. Cl.
| | |
|---|---|
| G06T 7/00 | (2017.01) |
| G06F 21/32 | (2013.01) |
| G06N 3/08 | (2023.01) |
| G06T 7/246 | (2017.01) |
| G06T 7/70 | (2017.01) |
| G06V 10/75 | (2022.01) |
| G06V 20/10 | (2022.01) |
| G06V 20/70 | (2022.01) |
| G06V 40/16 | (2022.01) |

(52) U.S. Cl.
CPC .............. *G06F 21/32* (2013.01); *G06N 3/08* (2013.01); *G06T 7/0014* (2013.01); *G06T 7/248* (2017.01); *G06T 7/70* (2017.01); *G06V 10/751* (2022.01); *G06V 20/10* (2022.01); *G06V 20/70* (2022.01); *G06V 40/161* (2022.01); *G06V 40/168* (2022.01); *G06V 40/172* (2022.01); *G06T 2207/20081* (2013.01); *G06T 2207/20084* (2013.01); *G06T 2207/30201* (2013.01)

(58) Field of Classification Search
None
See application file for complete search history.

(56) References Cited

U.S. PATENT DOCUMENTS

| | | |
|---|---|---|
| 8,721,337 B2 | 5/2014 | Calman et al. |
| 8,811,726 B2 | 8/2014 | Belhumeur et al. |
| 9,754,184 B2 | 9/2017 | Jaber et al. |
| 9,767,381 B2 | 9/2017 | Rodriguez-Serrano et al. |
| 10,002,427 B2 | 6/2018 | Linard et al. |
| 10,019,631 B2 | 7/2018 | Tao et al. |

(Continued)

*Primary Examiner* — Idowu O Osifade
(74) *Attorney, Agent, or Firm* — Armstrong Teasdale LLP

(57) ABSTRACT

A system for analyzing images is provided. The system includes a computing device having at least one processor in communication with at least one memory device. The at least one processor is programmed to receive an image including a plurality of objects, detect the plurality of objects in the image, determine dependencies between each of the plurality of objects, identify the plurality of objects based, at least in part, on the plurality of dependencies, and determine one or more objects of interest from the plurality of identified objects.

20 Claims, 10 Drawing Sheets

(56) References Cited

U.S. PATENT DOCUMENTS

| | | | |
|---|---|---|---|
| 2017/0169315 A1 | 6/2017 | Vaca et al. | |
| 2017/0243053 A1 | 8/2017 | Li et al. | |
| 2017/0337791 A1* | 11/2017 | Gordon-Carroll | H04W 4/023 |
| 2018/0373924 A1 | 12/2018 | Yoo et al. | |
| 2019/0236342 A1 | 8/2019 | Madden et al. | |
| 2020/0012887 A1 | 1/2020 | Li et al. | |
| 2020/0118375 A1 | 4/2020 | Tagawa et al. | |
| 2020/0327311 A1* | 10/2020 | Xu | G06N 3/08 |
| 2021/0097701 A1* | 4/2021 | McKennoch | G06T 7/74 |

* cited by examiner

SYSTEMS AND METHODS FOR ENHANCED REAL-TIME IMAGE ANALYSIS WITH A DIMENSIONAL CONVOLUTION CONCEPT NET

CROSS-REFERENCE TO RELATED APPLICATIONS

This application is a continuation of and claims the benefit of priority to U.S. patent application Ser. No. 17/697,270, filed Mar. 17, 2022, which is a continuation of and claims the benefit of priority to U.S. patent application Ser. No. 16/950, 424, filed Nov. 17, 2020, and entitled "SYSTEMS AND METHODS FOR ENHANCED REAL-TIME IMAGE ANALYSIS with a DIMENSIONAL CONVOLUTION CONCEPT NET," which issued as U.S. Pat. No. 11,308,620 on Apr. 19, 2022, which is a continuation of and claims the benefit of priority to U.S. patent application Ser. No. 16/853, 031, filed Apr. 20, 2020, and entitled "SYSTEMS AND METHODS FOR ENHANCED REAL-TIME IMAGE ANALYSIS WITH A DIMENSIONAL CONVOLUTION CONCEPT NET," which issued as U.S. Pat. No. 10,846,857 on Nov. 24, 2020, the contents of which are hereby incorporated by reference, in their entirety and for all purposes, herein.

BACKGROUND

The field of the present disclosure relates generally to analyzing images in real-time and, more specifically, to a dimensional convolution concept net to perform real-time analysis of images and video to recognize objects and actions.

Evaluation of images is labor-intensive process and may be dependent on subject matter expertise. Furthermore, evaluation of video is even more labor intensive. One major problem with image and video analysis, such as facial recognition and workplace safety analysis is the combination of speed and accuracy that is required. While additional hardware may improve the processing for these applications, this can be an expensive proposition. This is especially true for situations where the sensor that is capturing the images or video is distance from the processing. The amount of network bandwidth required to transmit video may be significant, especially at higher resolution. Accordingly, it would be advantageous to be able to accurately and quickly process images for image recognition without requiring significant computing resources.

BRIEF DESCRIPTION

In one aspect, a system for analyzing images in real-time is provided. The system includes a computing device including at least one processor in communication with at least one memory device. The at least one processor is programmed to receive an image including a plurality of objects. The at least one processor is also programmed to detect the plurality of objects in the image. The at least one processor is further programmed to determine dependencies between each of the plurality of objects. In addition, the at least one processor is programmed to identify the plurality of objects based, at least in part, on the plurality of dependencies. Moreover, the at least one processor is programmed to determine one or more objects of interest from the plurality of identified objects.

DETAILED DESCRIPTION

Figure 1:
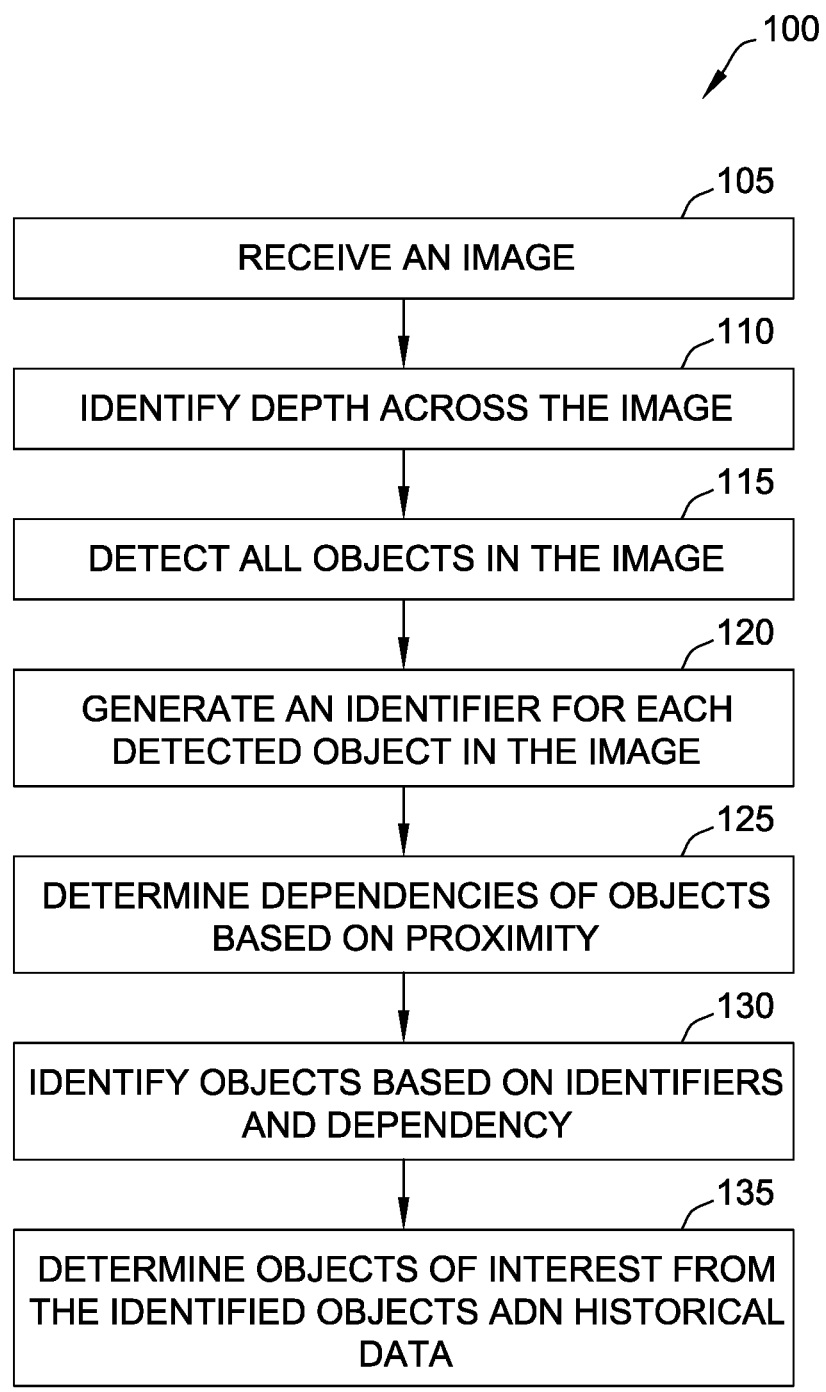
FIG. 1 illustrates a block diagram of a process for performing image recognition and analysis.

The implementations described herein relate to systems and methods for analyzing images and, more specifically, to analyzing image data to detect, identify, and track objects of interest in the image. In particular, a Dimensional Convolutional Concept Net (DCCN) computing device is programmed to (1) learn to identify objects; (2) identify those objects in image or video data; and (3) track those objects over time in real-time.

In the exemplary embodiment, the DCCN computing device receives an image. In some embodiments, this is a stand-alone image. In other embodiments, this image one of a series of images. In still further embodiments, the image is from a video. In the exemplary embodiment, the image is received in real-time. In some embodiments, the image is a face or other biometric data, such as in a facial scanner that controls a lockout mechanism (i.e., a vehicle lockout or door lock). In other embodiments, the image is of a factory floor or other workplace with active machine or other potential hazards (i.e., a bank lobby). In still other embodiments, the image is of a city street or other monitored location.

The DCCN computing device executes a classifier to identify depth across the image. The DCCN computing device determines the depth of each part of the image. In some embodiments, the depth classification is performed by analyzing light sources and light source reflections. In other embodiments, the depth classification is performed by analyzing parallel lines to find convergence and/or to determine the parallax and estimate the relative distances from the viewer.

Then the DCCN computing device detects all of the objects in the image. In the exemplary embodiment, the DCCN computing device finds a center of mass for each small piece of the image that can be separated from the rest of the image. For example, in a facial recognition embodiment, the DCCN computing device may separate each iris and each pupil as a separate object or the DCCN computing device may detect the nose as a single objet. In a factory embodiment, the DCCN computing device may recognize different floormats as separate objects. The DCCN computing device may also break up a chair into different objects, such as the chair legs, the seat, and the back. The DCCN computing device may detect individual objects based on color, shade, lighting, and relative distance.

The DCCN computing device determines the relative distances of each object from each other based on the width, height, and depth. The DCCN computing device generates an identifier for each object. The identifier includes information about the various attributes of the object, including, but not limited to, the size, relative location, saturation hue, and other information necessary to identify the object. In the exemplary embodiment, the identifier includes values for the various attributes of the corresponding object. For example, one set of values in the identifier may describe the color while another set of values describe the size of the object.

In the exemplary embodiment, the DCCN computing device determines the dependencies of the objects based, at least in part, on proximity. For example, the DCCN computing device may determine that a hand object is associated with an arm object, or that a hat object is associated with a head object, or that a sticker object is associated with the hard hat that the sticker object is affixed to. In the exemplary embodiment, at this stage, the DCCN computing device has not identified the different objects. The DCCN computing device links the objects based on relative proximity in the three dimensions.

In the exemplary embodiment, the DCCN computing device identifies the objects based on their identifiers and their dependencies. In the exemplary embodiment, the DCCN computing device stores, in a database, a listing of objects based on context. These listings include a plurality of objects that are each identified by their attributes, using value sets like those in the identifiers. Therefore, the DCCN computing device compares the values of the identifier of the object to those in the database to identify the object. To improve the speed of this process, the DCCN computing device limits the set of items in the database that it is comparing based on the context. For example, on a factory floor, if the DCCN computing device has recognized a hand, then the DCCN computing device may search for items that would be around a hand. Or in the facial recognition embodiment, the DCCN computing device may recognize a pupil of an eye and then compare nearby objects to the value sets of irises to identify the iris. Furthermore, if two objects have the same identifier or similar identifiers, the DCCN computing device may use the identified object's identity as a starting point for identifying the second object. In some embodiments, if the DCCN computing device is unable to identify an object, the DCCN computing device may search another database or an external database to identify the object. This may take extra time and slow down the process.

Once the objects are identified, the DCCN computing device determines one or more objects of interest of the plurality of objects. In some embodiments, objects are considered objects of interest if they cannot be identified. In other embodiments, objects of interest are determined based on movement or proximity to other objects. In the exemplary embodiment, the DCCN computing device is able to determine the movement and speed of an object based on the object's change in position from previous images. In some embodiments, the DCCN computing device determines the objects of interest based on their proximity to other objects. For example, if a hand is 20 feet away from a dangerous object, such as an active machine, then the hand is less of interest than if the hand were within arm's reach of the dangerous object.

In some embodiments, the DCCN computing device determines if there are any actions required based on the objects of interest. For example, if the DCCN computing device determines than an unprotected hand is moving towards a dangerous object, such as a hot glass beaker, the DCCN computing device may cause an alarm to sound to stop the owner of the hand from hurting themselves. In another example, if the DCCN computing device determines that a person is falling towards an active machine, the DCCN computing device may send a shutdown command to the active machine to prevent further damage to the person.

Described herein are computer systems such as the DCCN computing devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application-specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

The patent claims at the end of this document are not intended to be construed under 35 U.S.C. § 112(f) unless traditional means-plus-function language is expressly recited, such as "means for" or "step for" language being expressly recited in the claim(s).

For the purposes of this discussion, terminal charts will be used as an example of the type of images that may be categorized and analyzed. Terminal charts are maps for pilots to understand procedures for flying into or out of an airport. Categories for terminal charts may include, but are not limited to, approach, arrival, departure, and airport map. In the exemplary embodiment, terminal charts are vector-based graphic files. Terminal charts may be generated by hand or through the use of automated graphic generation programs, such as by conversion from raster graphics, scanned images, or previous version from other programs.

FIG. 1 illustrates a block diagram of a process 100 for performing image recognition and analysis. In the exemplary embodiment, process 100 is performed by a Dimensional Convolutional Concept Net (DCCN) computing device 810 (shown in FIG. 8).

Figure 8:
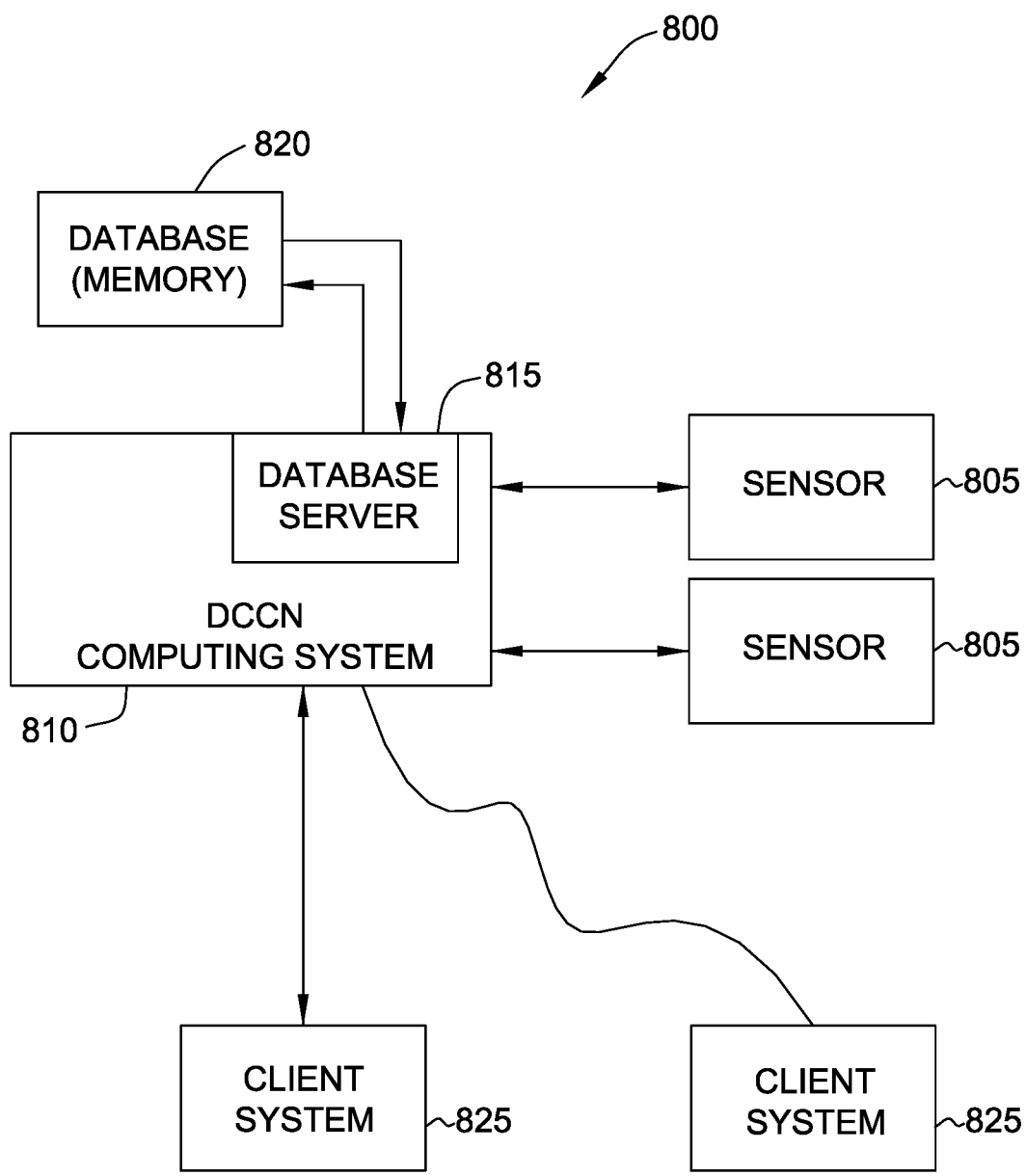
FIG. 8 is a simplified block diagram of an example system for executing the process shown in FIG. 1.

In the exemplary embodiment, the DCCN computing device 810 is in communication with one or more sensors 805 (shown in FIG. 8). The DCCN computing device 810 receives 105 an image from the one or more sensors 805. In some embodiments, this is a stand-alone image. In other embodiments, this image one of a series of images. In still further embodiments, the image is from a video. In the exemplary embodiment, the image is received in real-time. In some embodiments, the image is a face or other biometric data, such as in a facial scanner that controls a lockout mechanism (i.e., a vehicle lockout or door lock). In other embodiments, the image is of a factory floor or other workplace with active machine or other potential hazards (i.e., a bank lobby). In still other embodiments, the image is of a city street or other monitored location.

The DCCN computing device 810 executes a classifier to identify 110 depth across the image. The DCCN computing device 810 determines the depth of each part of the image. In some embodiments, the depth classification is performed by analyzing light sources and light source reflections. In other embodiments, the depth classification is performed by analyzing parallel lines to find convergence and/or to determine the parallax and estimate the relative distances from the viewer.

Then the DCCN computing device 810 detects 115 all of the objects in the image. In the exemplary embodiment, the DCCN computing device 810 finds a center of mass for each small piece of the image that can be separated from the rest of the image. For example, in a facial recognition embodiment, the DCCN computing device 810 may separate each iris and each pupil as a separate object or the DCCN computing device 810 may detect 115 the nose as a single objet. In a factory embodiment, the DCCN computing device 810 may recognize different floormats as separate objects. The DCCN computing device 810 may also break up a chair into different objects, such as the chair legs, the seat, and the back. The DCCN computing device 810 may detect 115 individual objects based on color, shade, lighting, and relative distance. The DCCN computing device 810 determines the relative distances of each object from each other based on the width, height, and depth. The DCCN computing device 810 also uses the center of mass of the object to find the relative position of each pixel in the object, relative to the center of mass.

In the exemplary embodiment, the DCCN computing device 810 generates 120 an identifier for each object. The identifier includes information about the various attributes of the object, including, but not limited to, the size, relative location, saturation hue, and other information necessary to identify the object. In the exemplary embodiment, the identifier includes values for the various attributes of the corresponding object. For example, one set of values in the identifier may describe the color while another set of values describe the size of the object.

In the exemplary embodiment, the basic dimensional serialization is a value and position based system which links dependencies similar to Linnaean taxonomy where highly diverse objects are labeled and grouped based on shared attributes or concepts. The numbers themselves are only relevant based on comparative value and comparative position. If, for example, the DCCN computing device 810 establishes a relevant cross section of image dimensional values for an image containing a vase and a table. The DCCN computing device 810 then uses the dimensional data to generate a serial number based on the neuronal value of a single dimensional layer, each number generated is a representative of a particular dimensional aspect.

To simplify, for a given example image and neural net (understanding that the input and output layer size is not fixed, but adjusts to fit the input data), every dimensional output layer has 6 neurons. If each output layer neuron in this example is sigmoid, the values would range between 0 and 1 for a 6 digit number. Factored for base 10, an RGB layer state may produce a serialized value of 311614 while an HSV layer has a value of 661143 and a relative size of 117164. If these three values alone were enough to identify the vase in the image, the vase in general terms could be called 311614,661143,117164. If the table's value using the same method is 446112,771882,663918, and a hierarchical relationship is established between the vase and the table. The DCCN computing device 810 then applies the full serialization to the combinative concept. The identifier for the vase must include the table dependency and therefore the vase is catalogued as 446112,771882,663918X311614, 661143,117164 and if a flower with an RGB,HSV,RS classifiable dimensional value of 118227,553816,110143 was in the vase, it would have a full value represented as 446112, 771882,663918×311614,661143,117164×118227,553816, 110143. Again, the above is extremely simplified because in practice the dimensional values would be much larger and include many more dimensions.

The full dimensional aspect number can be further simplified in additional hidden layer processing in the same way that a fingerprint can be used to identify a whole person. Algorithms can be applied to identify a representative cross-section of the full hierarchical value of each object and the associated dependencies to establish a much shorter unique identifier, which can then be reduced or expanded for additional processing using concept values rather than true image values for greater processing efficiency and machine learning.

In the exemplary embodiment, the DCCN computing device 810 determines 125 the dependencies of the objects based, at least in part, on proximity. For example, the DCCN computing device 810 may determine 125 that a hand object is associated with an arm object, or that a hat object is associated with a head object, or that a sticker object is associated with the hard hat that the sticker object is affixed to. In the exemplary embodiment, at this stage, the DCCN computing device 810 has not identified the different objects. The DCCN computing device 810 links the objects based on their relative proximity in the three dimensions. One aspect of dimensionality of the objects, is their ability to hold something else. Therefore, in Step 125, the DCCN computing device 810 is rebuilding the image based on the hierarchy of the objects in regards to their dimensional relationship to each other, this includes not only relative distance, but also their ability to hold or be held by the other proximate objects. This may also be known as landmark detection, where every object contains something or is contained by something.

In the exemplary embodiment, the DCCN computing device 810 identifies 130 the objects based on their identifiers and their dependencies. In the exemplary embodiment, the DCCN computing device 810 stores, in a database, a listing of objects based on context. These listings include a plurality of objects that are each identified by their attributes, using value sets like those in the identifiers. Therefore, the DCCN computing device 810 compares the values of the identifier of the object to those in the database to identify the object. To improve the speed of this process, the DCCN computing device 810 limits the set of items in the database that it is comparing based on the context. For example, on a factory floor, if the DCCN computing device has recognized a hand, then the DCCN computing device may search for items that would be around a hand. Or in the facial recognition embodiment, the DCCN computing device 810 may recognize a pupil of an eye and then compare nearby objects to the value sets of irises to identify the iris. Furthermore, if two objects have the same identifier or similar identifiers, the DCCN computing device 810 may use the identified object's identity as a starting point for identifying the second object. In some embodiments, if the DCCN computing device 810 is unable to identify 125 an object, the DCCN computing device 810 may search another database or an external database to identify the object. This may take extra time and slow down process 100.

In the exemplary embodiment, the DCCN computing device 810 searches to identify 125 objects based on categories. If the DCCN computing device 810 identifies a specific object, such as toilet, the DCCN computing device 810 will expect to find other toilet related objects, such as toilet paper in proximity to the toilet. By identifying the first object as a toilet, the DCCN computing device 810 determines the context of the objects in the image. If the DCCN computing device 810 identifies an object as an automobile, the DCCC computing device 810 will expect other objects in the vicinity to be related to automobiles. This also relates to the smaller objects as well, if the DCCN computing device 810 identifies an object as an eyebrow, the DCCN computing device 810 will attempt to identify other linked objects as other parts of a face. By analyzing and identifying the objects based on their context, the DCCN computing device 810 reduces the amount of searching time necessary to identify objects as the DCCN computing device 810 starts searching in a category that has the highest likelihood of containing the identity of the object.

Once the objects are identified, the DCCN computing device 810 determines 135 one or more objects of interest of the plurality of objects. In some embodiments, objects are considered objects of interest if they cannot be identified. In other embodiments, objects of interest are determined 135 based on movement or proximity to other objects. In the exemplary embodiment, the DCCN computing device 810 is able to determine the movement and speed of an object based on the object's change in position from previous images. In some embodiments, the DCCN computing device 810 determines the objects of interest based on their proximity to other objects. For example, if a hand is 20 feet away from a dangerous object, such as an active machine, then the hand is less of interest than if the hand were within arm's reach of the dangerous object. Furthermore, since objects are contained by other objects, the DCCN computing device 810 is able to determine which objects are moving together. For example a jacket is moving with a person and an object that is sticking out of the pocket of the jacket, will move with the jacket and the person. In this way, the DCCN computing device 810 doesn't need to track the jacket, pocket, and object separately, but based on how they move together.

In some embodiments, the DCCN computing device 810 determines if there are any actions required based on the objects of interest. For example, if the DCCN computing device 810 determines than an unprotected hand is moving towards a dangerous object, such as a hot glass beaker, the DCCN computing device 810 may cause an alarm to sound to stop the owner of the hand from hurting themselves. In another example, if the DCCN computing device 810 determines that a person is falling towards an active machine, the DCCN computing device 810 may send a shutdown command to the active machine to prevent further damage to the person.

In some further embodiments, the DCCN computing device 810 is able to use unsupervised learning to identify objects of interest. In these embodiments, the DCCN computing device 810 monitors a location for a period of time, such as a factory floor. As time passes, the DCCN computing device 810 learns the patterns of behavior that are expected on the factory floor. For example, the DCCN computing device 810 learns to expect certain movements from the employees when a machine is being loaded and/or unloaded. The DCCN computing device 810 learns that no movement is expected between the hours of 10 μm and 6 am, aka when the factory is closed.

In some embodiments, the DCCN computing device 810 is in communication with another database or sensors associated with one or more machines. The DCCN computing device 810 uses this information to evaluate the effectiveness of the actions of one or more employees. For example, the DCCN computing device 810 may determine that one employee is more efficient because they do some preloading actions to prepare the manufacturing device for operation. The DCCN computing device 810 may tag this information for further review, such as by a manager. The DCCN computing device 810 may also determine that an individual is not present at a machine for long periods of time and recognize that. The DCCN computing device 810 may further determine that an individual fails to wear the proper safety gear all of the time.

In some further embodiments, the DCCN computing device 810 is connected to a temperature sensor and is acting as a facial recognition scanner, such as at a hospital. The DCCN computing device 810 may identify individuals and determine their current temperature. If the temperature exceeds a safe range, then that individual may be preventing from accessing the building because they may have a fever. The DCCN computing device 810 may also be conditioned to recognize individuals who are wearing a face mask, and may set off an alarm or warning if the recognized individual is not wearing a face mask. In still further embodiments, the DCCN computing device 810 may be configured to identify the individual and then require the individual to put on a face mask, after being identified, before they are approved.

In some embodiments, the DCCN computing device 810 categorizes some objects as background objects and of lesser importance than other objects, that may be elevated to objects of interest. For example, in the factory floor example, the DCCN computing device 810 may recognize the floor, the walls, signs on the walls, and the fire extinguisher as background objects. These objects don't moving between images are considered a part of the background. If one of the objects moves, such as a person picks up the fire extinguisher, then the fire extinguisher may no longer be considered a background object and may be elevated to an object of interest. As these background objects don't change from image to image, the DCCN computing device 810 may quickly identify 130 them as their object identifiers from Step 120 are the same or similar every time. By classifying objects as background objects, and analyzing the objects of interest, the DCCN computing device 810 reduces the amount of pixels of the image that need to be analyzed. For example, a 1980 by 640 pixel image may be reduced to −0.300 pixels worth of objects that need to be analyzed.

In the exemplary embodiment, the DCCN computing device 810 uses a convoluted neural network with process 100. In this embodiment, the input layer of the neural network receives the individual detected objects. Then the input layer is resized during process 100 into a convoluted neural network. This allows the DCCN computing device 810 to determine patterns of behavior of objects. These patterns include, but are not limited to, known dependencies, movement patterns, and identifying known background objects.

In the exemplary embodiment, the DCCN is unique among traditional neural nets because the process uses an end-to-end artificial intelligence (AI) model. The DCCN computing device 810 uses machine learning to develop feature detection mechanisms that are originally based on concepts, but which are expanded upon with each new training iteration. One example would be in the identification of a coffee cup. When enough dimensional output layers produce a pattern consistent with the identification of a coffee cup based on prior learning, the DCCN computing device 810 has a determined number of nodes in a connected input layer that is populated from observed values in those dimensional output layers and the balance of the nodes are filled with stored values from a general coffee cup concept net. This allows the DCCN computing device 810 to make predictions about the coffee cup based on assumptions from previous training, while simultaneously making adjustments to the coffee cup concept net based on new observations. Additional concept nets are associated in the same hierarchical arrangement as the dimensional image aspects. Because the pattern recognition is driven by AI model experience, the ratio of observational nodes to concept nodes is a function of situational accuracy determined through learning. In instances of low light or extreme perspectives, the DCCN computing device 810 may learn over time to fill more nodes with concept values to improve the predictions. In this way the whole system is scalable and treats individual objects and individual concepts in the same way. Furthermore, the DCCN computing device 810 is able to truncate the massive "serial number" for each dimension, object, or concept based on machine learning. The amount of truncation allowed and the manner in which observational and concept data are determined by an evolving, concept based hierarchical model which behaves in a situationally fluid manner.

In a further example, the DCCN computing device 810 may include information about what a coffee cup looks like. The DCCN computing device 810 will then update that model every time that it finds and recognizes another coffee cup. In some embodiments, this model is stored based on serial numbers. This means that by using the serial number system, the DCCN computing device 810 may recognize an object as a coffee cup, even if the coffee cup is upside down or sideways.

One advantage of using process 100 with a neural network it that process 100 allows for an infinite input layer rather than forcing the image to be a specific size based on the neural network. In many neural networks used for image processing, the input layer of the neural network is set to a specific size, where each neuron of the input layer of the neural network is fixed to a specific x,y position for the pixel that resides at that position. These neural networks will then create a fully connected layer at the end to flatten it. This means that for these networks, the image has to be resized to fit to the neural network.

However, the process 100, described herein, allows for an infinite size input layer. Rather than just receiving individual pixels of the image in each neuron, instead the neurons of the input layer receive the detected objects. This allows for any number of objects to be detected and then placed into the neurons of the input layer. Since the detected objects are positioned relatively in the image, rather than absolutely, the input layer may be resized dynamically based on the number of input objects, rather than the pixel dimensions of the image.

Furthermore, since the neural network is dynamically shaped by the input objects, rather than the size of the image, this allows process 100 to be used with a wider range of uses, to the point where it may be considered general purpose. In the exemplary embodiment, the DCCN computing device 810 may be set up in a situation to learn the nominal or normal behavior of the system or location being viewed. Then the DCCN computing device 810 may use unsupervised learning to recognize and predict abnormal behavior.

In some embodiments, the DCCN computing device 810 may be used to track a specific object in an image, such as that being viewed by a camera. A user may tell the DCCN computing device 810 to track a specific object that is currently in the image. The DCCN computing device 810 may then use process 100 to recognize that object in future images. The DCCN computing device 810 may then notify the user when the object is present in future images and where it is in those images. The DCCN computing device 810 may also notify the user when the object is not present. This may be useful when tracking tools or safety equipment, such as in a factory or warehouse setting.

While the above process 100 is described with respect to analyzing images, in other embodiments, other sensors may be used with this process 100 as well. In these embodiments, the DCCN computing device 810 creates dimensionality for the sensor data by applying a classifier to the sensor data to retrieve the dimensional information. In one example, the DCCN computing device 810 instructs the neural network to watch a particular object's interaction with its environment and have the neural network include temperature changes in said object. If an event being watched for is usually preceded by specific thermal changes in an object(s) prior to visual cues, then it becomes practical to include that data in the machine learning stage as to dramatically increase the efficiency of detection. This would also be the case for emissions, audible cues, or even olfactory data given an appropriate sensor.

Figure 2:
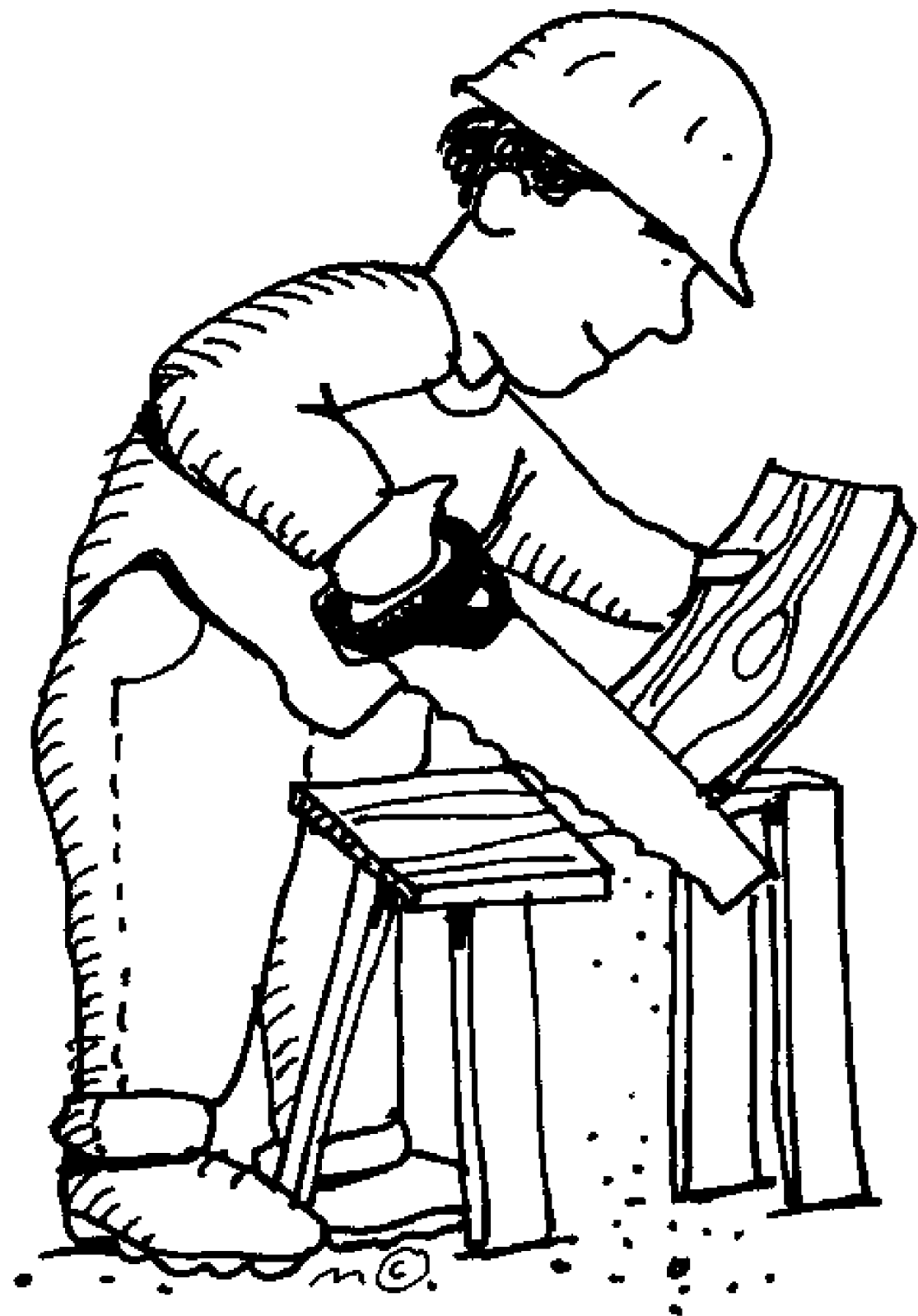
FIG. 2 illustrates an exemplary image that may be analyzed using the process shown in FIG. 1.
Figure 3:
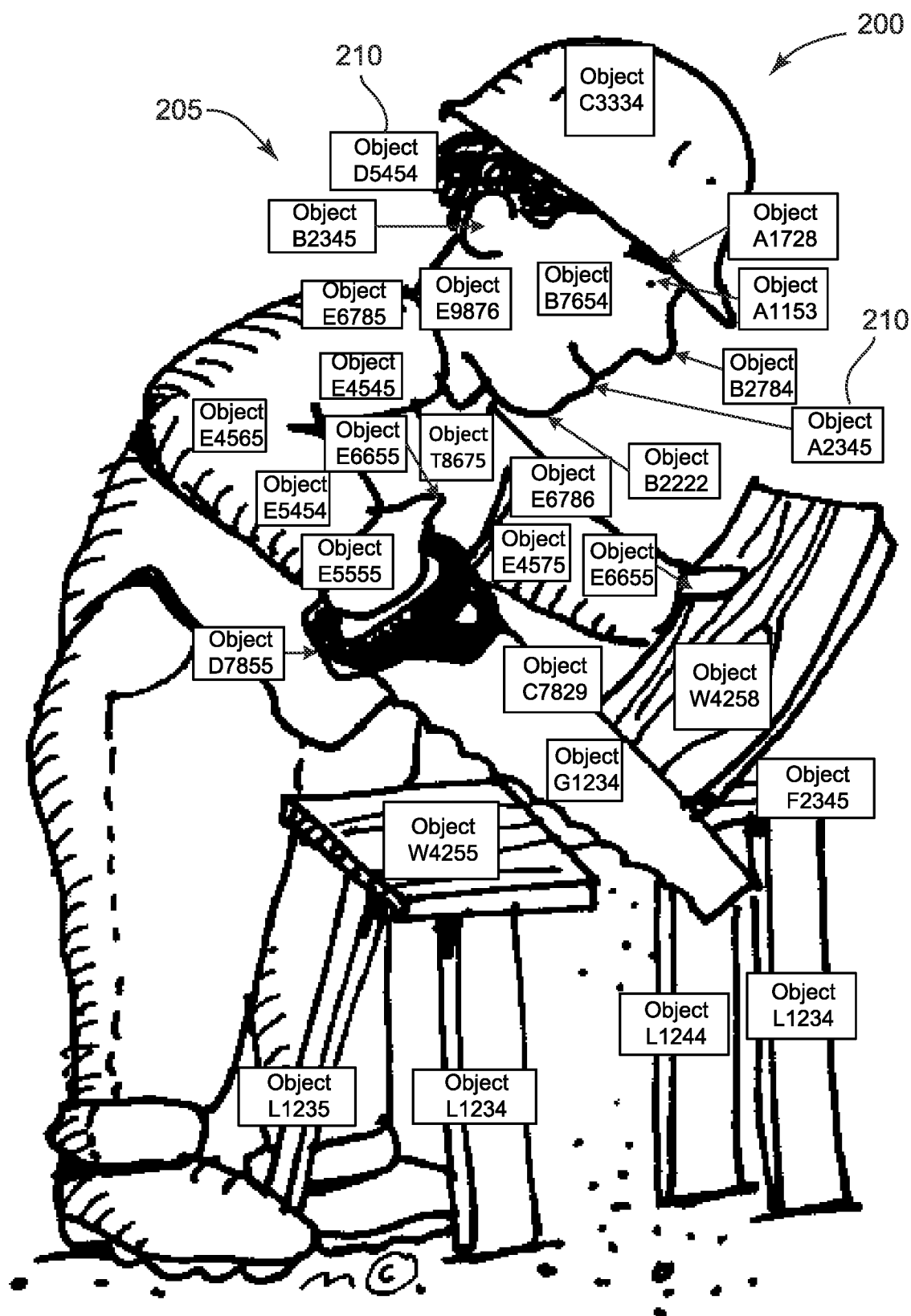
FIG. 3 illustrates an exemplary plurality of detected objects in the image shown in FIG. 2 in accordance with the process shown in FIG. 1.
Figure 4:
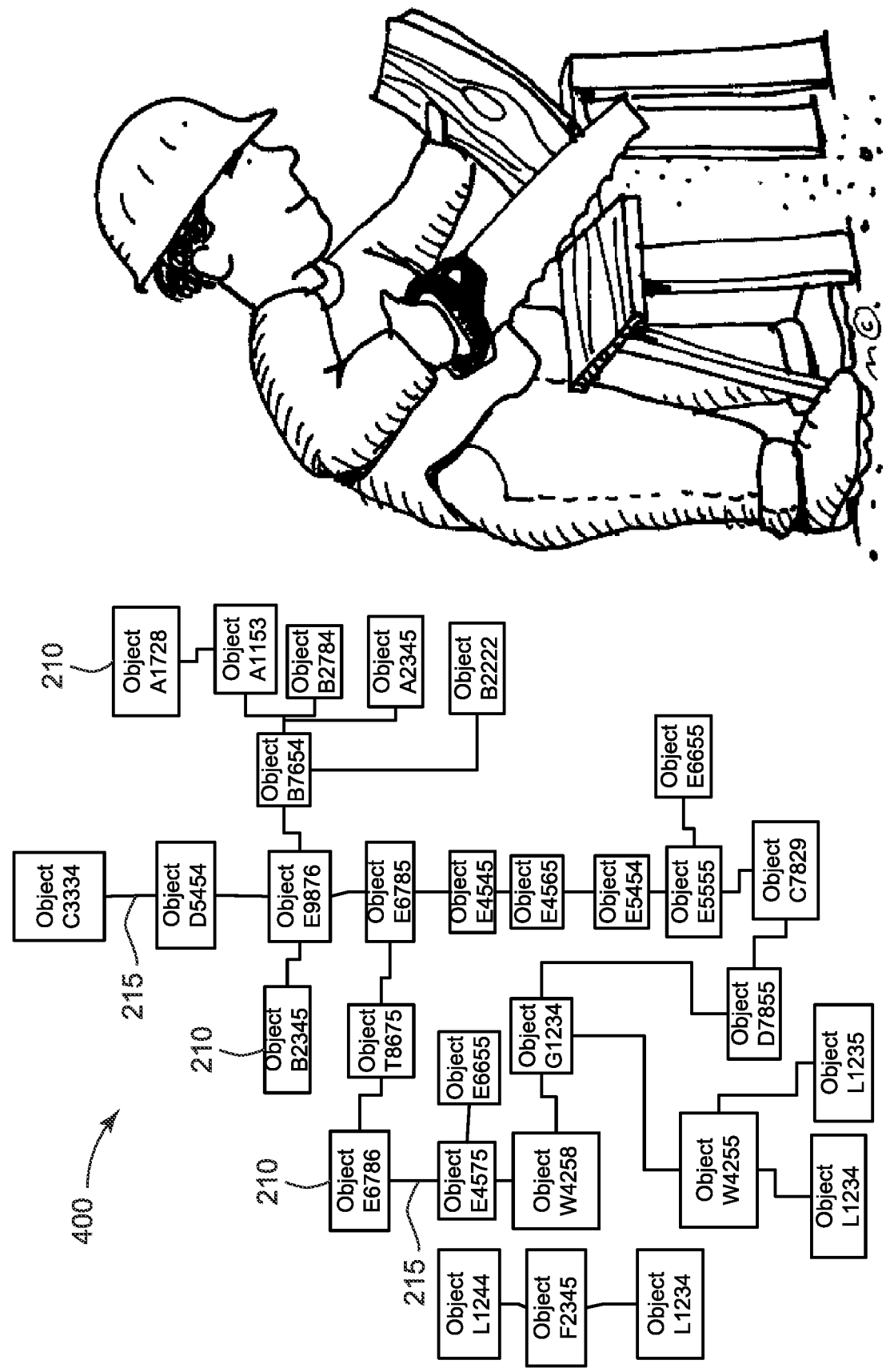
FIG. 4 illustrates an exemplary block diagram of the linkages between the plurality of detected objects in the image shown in FIG. 2 in accordance with the process shown in FIG. 1.
Figure 5:
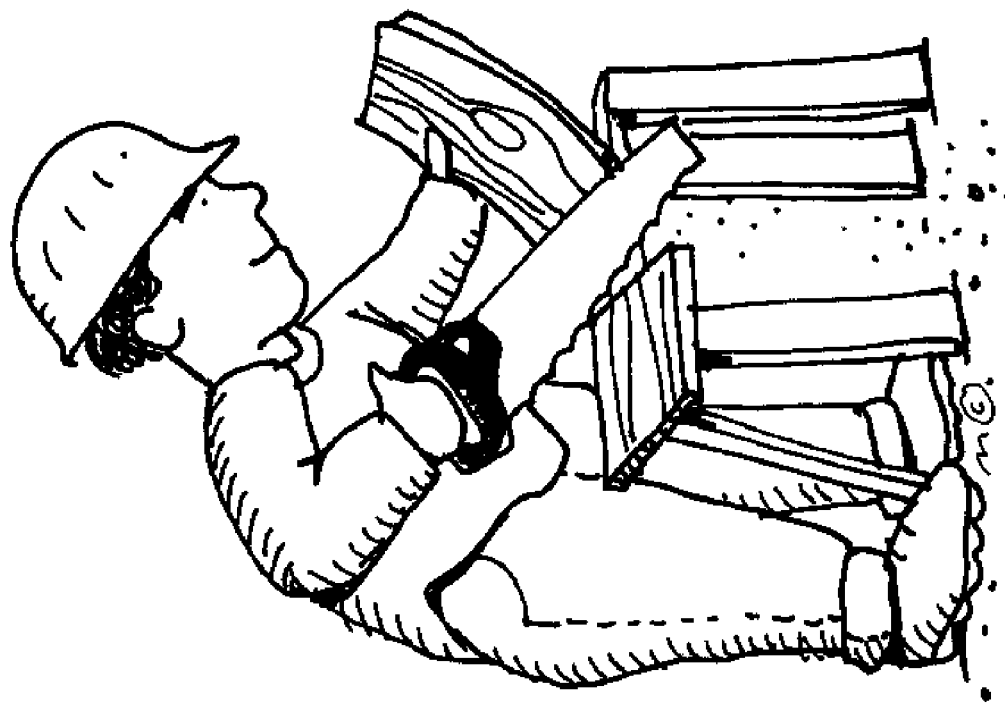
FIG. 5 illustrates an exemplary block diagram of the plurality of identified objects in the image shown in FIG. 2 in accordance with the process shown in FIG. 1.
Figure 5:
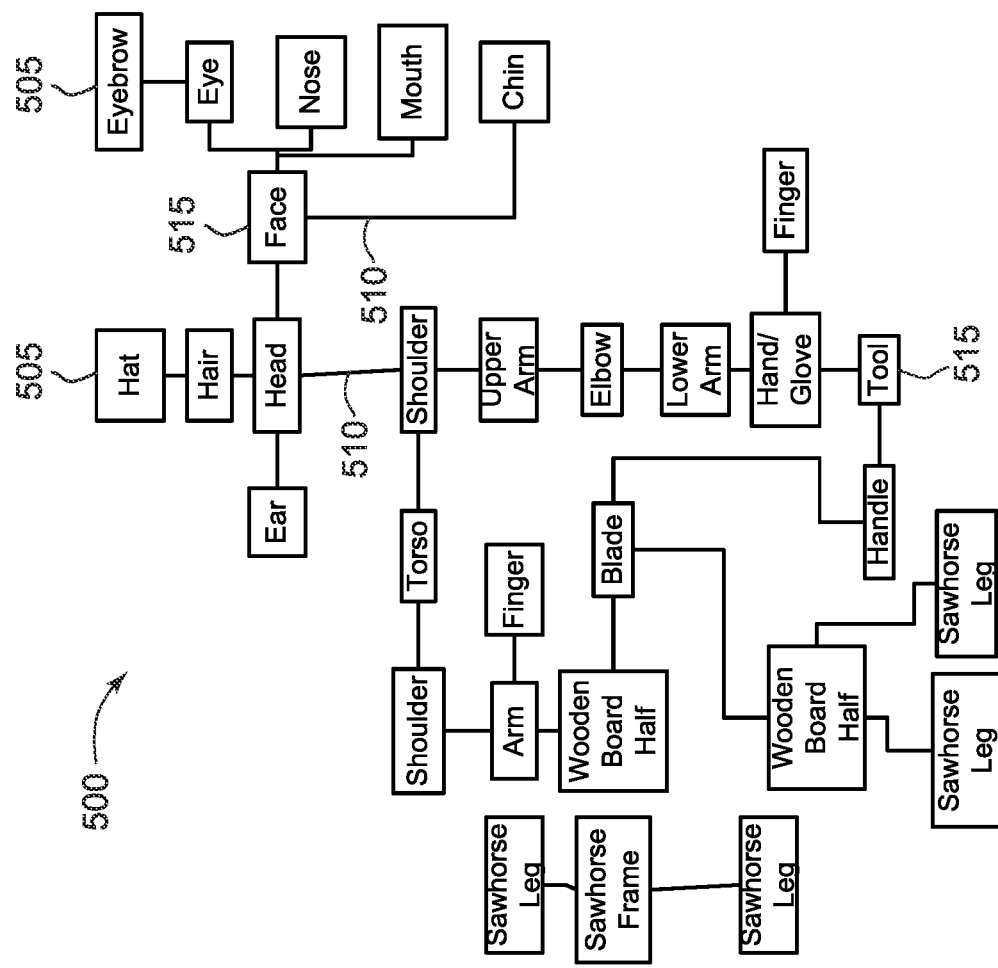

FIGS. 2 through 5 illustrate an example iteration of process 100 (shown in FIG. 1). FIG. 2 illustrates an exemplary image 200 that may be analyzed using the process shown in FIG. 1. FIG. 3 illustrates an exemplary plurality of detected objects 205 in the image 200 (shown in FIG. 2) in accordance with the process 100 (shown in FIG. 1). FIG. 4 illustrates an exemplary block diagram 400 of the linkages 215 between the plurality of detected objects 205 in the image 200 (shown in FIG. 2) in accordance with the process 100 (shown in FIG. 1). FIG. 5 illustrates an exemplary block diagram 500 of the plurality of identified objects 505 in the image 200 (shown in FIG. 2) in accordance with the process 100 (shown in FIG. 1).

For this iteration of process 100, the DCCN computing device 810 receives 105 image 200. Image 200 shows a person sawing a board in half. The DCCN computing device 810 identifies 110 depth across the image 200. FIG. 3 illustrates a plurality of objects 205 contained in the image 200. For example, image 200 includes objects such as, but not limited to, a saw, a board, a sawhorse, and a person. Those objects 205 can be further broken down into smaller objects. The saw is made up of a handle and a blade. The board is in two pieces, and the sawhorse includes four legs. The DCCN computing device 810 detects 115 all of the objects 205 in the image 200. The DCCN computing device 810 generates an identifier 210 for each object 205 in the image 200. As shown in FIG. 3, the identifier 210 for the person's ear is B2345. The identifier 210 for the two halves of the wooden board are W4255 and W4248. This shows that those two objects are similar. The two fingers of the person that are shown are both identified as E6655. The four legs of the sawhorse are L1234, L1235, L1244, and L1234.

The DCCN computing device 810 determines 125 the dependencies of the objects 205 based on proximity. Diagram 400 illustrates the dependency linkages 215 between the object identifiers 210. For example, the object identifier for the hat (C3334) is linked to the identifier for the hair (D5454). Then the DCCN computing device 810 identifies 130 the objects 205 based on the identifiers 210 and the dependency linkages 215.

In the exemplary embodiment, the DCCN computing device 810 compares the values of the identifiers 210 of the objects 205 to values of other objects stored in the database. Based on how close of a match there it, the DCCN computing device 810 determines whether or not the object 205 is similar to the object described in the database. In some embodiments, the DCCN computing device 810 identifies 130 the object 205 based on an exact match or partial match of a portion of the values in the object identifier 210. In some embodiments, the database is organized into categories, such that different types of objects are classified in different categories. For example, the wooden board may be in a wooden object category and the sawhorse may be in a metal category. The database may be categorized based on, but not limited to, color, texture, shape, material, and size. In addition in the exemplary embodiment, the database is also categorized based on context.

FIG. 5 illustrates an exemplary block diagram 500 of the plurality of identified objects 505 in the image 200 (shown in FIG. 2) in accordance with the process 100 (shown in FIG. 1). As shown in diagram 500 each object 505 is linked 510 to another object 505. Furthermore, there are container objects 515 that are made up of more objects 505. For example, the face object 515 is made up of and linked with the eyebrow, eye, nose, mouth, and chin objects 505.

The DCCN computing device 810 determines 135 objects of interest from the identified (and unidentified) objects 505. For example, the DCCN computing device 810 may consider the eyes of the person, the saw, and the board to be of interest as the person is sawing the board. In this case, the DCCN computing device 810 may determine that the person is not wearing safety glasses. The DCCN computing device 810 may log that information for future use. The DCCN computing device 810 may also send an alert to a foreman (or supervisor) or to the person to have the person put on safety glasses. The DCCN computing device 810 may also consider the hands and fingers of the person to be of interest. In this case, the DCCN computing device 810 may determine if the person is wearing work gloves and transmit an alert if the person is not wearing proper safety gear.

FIGS. 2 through 5 are for demonstration purposes and are simplified for explanation. Note that analysis of the lower half of the person's body is not performed simply for the demonstration herein. In process 100, all visible objects are detected and analyzed as described herein.

Figure 6:
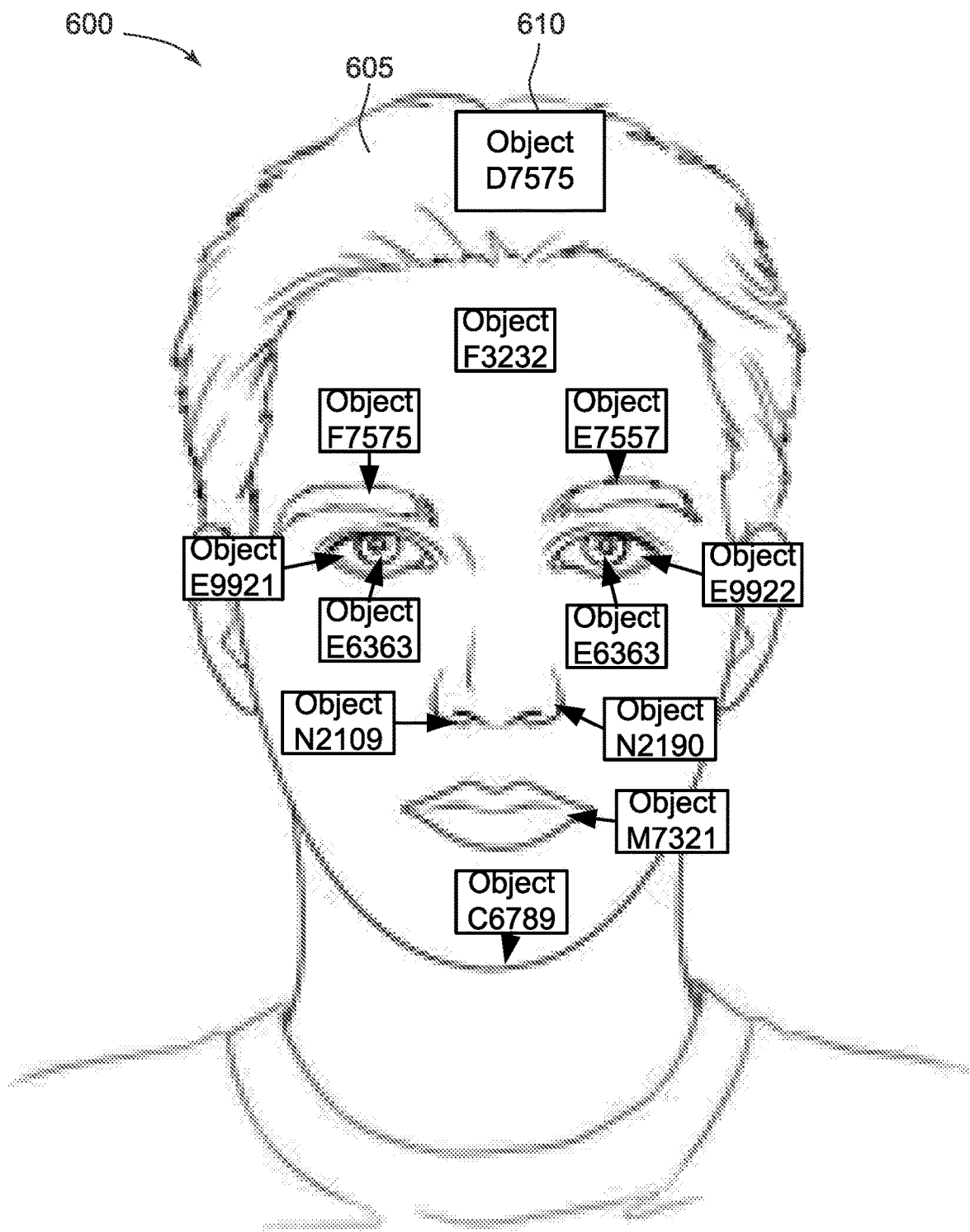
FIG. 6 illustrates an exemplary plurality of detected objects in another image in accordance with the process shown in FIG. 1.

FIG. 6 illustrates an exemplary plurality of detected objects 605 in another image 600 in accordance with the process 100 (shown in FIG. 1). Image 600 is a face, such as for a facial recognition application. As shown in FIG. 6, the objects 205 have been detected and have had identifiers 610 generated for each one of the detected objects 205. Image 600 may be from a facial recognition scanner used to access a door or information. In some embodiments, image 600 may include temperature information, such as through a thermographic scanner. In at least one further embodiment, the information from image 600 is combined with a temperature sensor to analyze the current health of the individual. In this embodiment, the DCCN computing device 810 may also determine if the individual is sweating or showing any other symptoms of a disease or other illness. This information may be combined with historical information for the individual. Such as if the individual has always been sweaty when the image was taken. This information would then be used to make the determination if the individual is allowed access.

Figure 7:
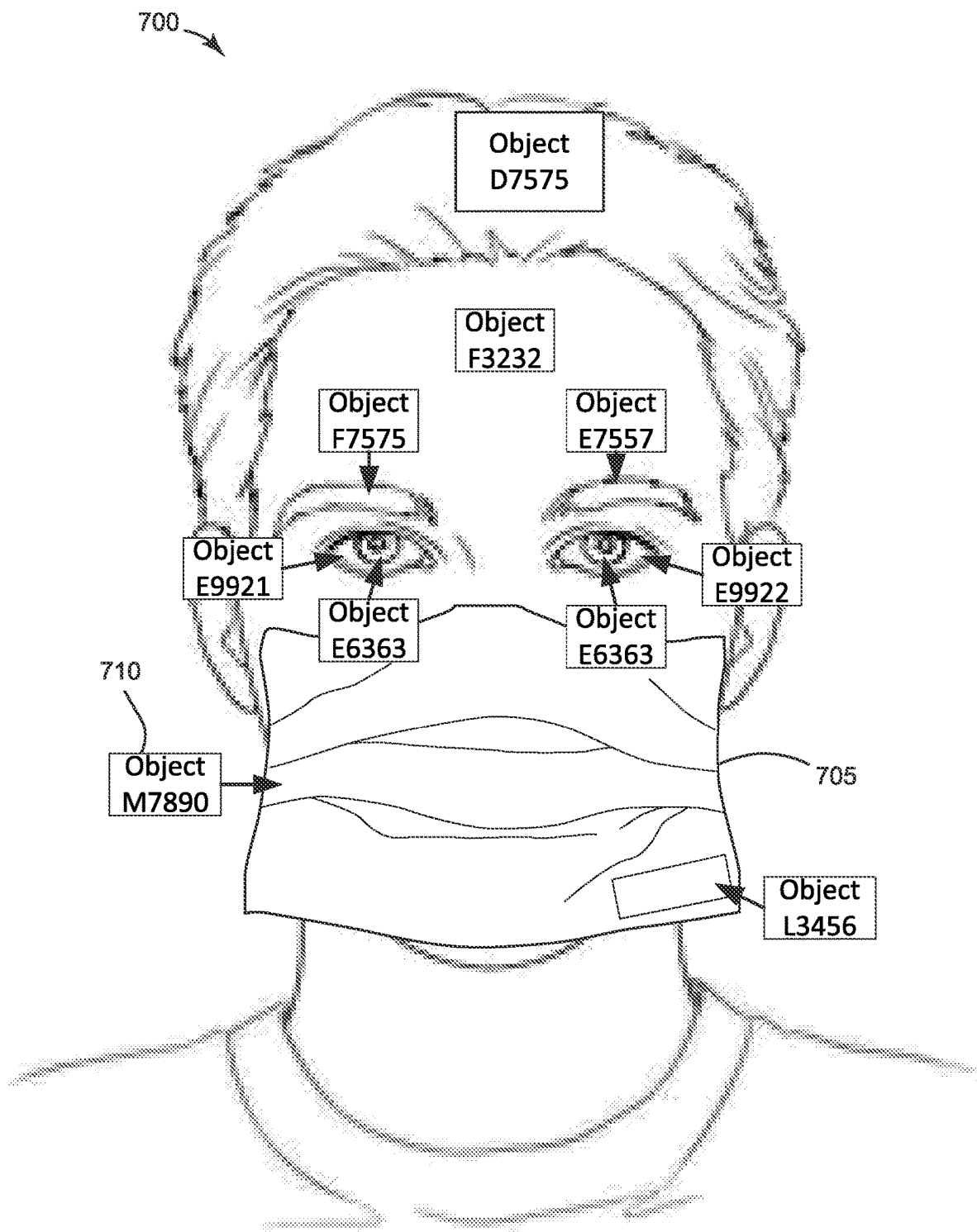
FIG. 7 illustrates a further plurality of detected objects in another image in accordance with the process shown in FIG. 1.

FIG. 7 illustrates a further plurality of detected objects in another image 700 in accordance with the process 100 (shown in FIG. 1). In FIG. 7, the individual is wearing a face mask 705. In some embodiments, the DCCM computing device 810 is programmed (and/or trained) to recognize the individual while the individual is wearing the face mask 705. In further embodiments, the DCCM computing device 810 determines if the individual is wearing a face mask 705. If the face mask 705 is not being worn (or not being properly worn) then the DCCM computing device 810 may transmit an alert or warning to the individual to wear the face mask 705. In still further embodiments, the DCCN computing device 810 may be configured to identify the individual and then require the individual to put on a face mask 705, after being identified, before they are approved.

In some embodiments, the DCCM computing device 810 detects and identifies the face mask 705. Then the DCCM computing device 810 determines if the face mask 705 is being properly worn based on the mask's orientation and what features of the individual's face are visible. If the mouth is visible, then the DCCM computing device 810 determines that the mask 705 is not properly worn and instructs the individual to put the mask 705 on. If one or more of the nostrils are visible, then the DCCM computing device 810 may instruct the user to adjust the mask to properly cover the nose.

In other embodiments, the DCCM computing device 810 may analyze the individual for other safety gear, such as, but not limited to, hard hats, safety goggles or glasses, ventilators, ear protection, and/or any other safety equipment that the individual would need once access is granted. The DCCM computing device 810 may also determine if the proper safety gear is being used. For example, if the individual is wearing a mask 705, but the requirement is a different type of mask, the DCCM computing device 810 may deny access until the proper equipment is being used. The DCCM computing device 810 may inform the individual of the proper gear or the gear that the individual needs to acquire to gain access to the protected location. In the exemplary embodiment, the DCCN computing device 810 uses one or more object identifiers 710 associated with the mask 705 to identify the mask 705 and determine if it is correctly positioned and is the correct mask 705.

FIG. 8 is a simplified block diagram of an example system 800 for executing the process 100 (shown in FIG. 1). In the example embodiment, the system 800 is used for analyzing image data to detect and identify objects of interest in the image. In some embodiments, the system 800 is also used to perform facial recognition and/or monitor locations, such as a factory floor errors. In addition, the system 800 is a real-time image analyzing and object identifying and tracking computer system that includes a Dimensional Convolutional Concept Net (DCCN) computer device 810 (also known as a DCCN server) configured to analyze images and identify objects.

As described above in more detail, the DCCN server 810 is programmed to analyze images to identify objects of interest in those images. In addition, the DCCN server 810 is programmed to train one or more models to perform process 100. In some embodiments, the DCCN server 810 is programmed to a) receive an image; b) identify depth across the image; c) detect all objects in the image; d) generate an identifier for each detected object in the image; e) determine dependencies of objects based on proximity; f) identify objects based on the identifiers and dependencies; and g) determine objects of interest from the identified objects and historical data.

Sensor 805 observes a device, a system, an object, an individual, and/or a location over time. More specifically, sensor 805 measures one or more measured attributes of the observed items and is in communication with a DCCN server 810. Sensor 805 connects to DCCN server 810 through various wired or wireless interfaces including without limitation a network, such as a local area network (LAN) or a wide area network (WAN), dial-in-connections, cable modems, Internet connection, wireless, and special high-speed Integrated Services Digital Network (ISDN) lines. Sensor 805 receives data about conditions of an observed item and reports those conditions to DCCN server 810. In other embodiments, sensors 805 are in communication with one or more client systems 825 and the client systems 825 route the sensor data to the DCCN server 810. In some embodiments, the sensor 805 includes one or more of a visible light spectrum camera, an ultra-violet light camera, an infrared camera, a thermographic scanner, a temperature sensor, a vibration sensor, a microphone, and/or any other sensor that provides information to the DCCN server 810.

In the example embodiment, client systems 825 are computers that include a web browser or a software application, which enables client systems 825 to communicate with DCCN server 810 using the Internet, a local area network (LAN), or a wide area network (WAN). In some embodiments, the client systems 825 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client systems 825 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. In at least one embodiment, one or more client systems 825 are associated with security and/or manufacturing systems.

A database server 815 is communicatively coupled to a database 820 that stores data. In one embodiment, the database 820 is a database that includes one or more of identified object identifiers, context information, classifying algorithms, and historical data. In some embodiments, the database 820 is stored remotely from the DCCN server 810. In some embodiments, the database 820 is decentralized. In the example embodiment, a person can access the database 820 via the client systems 825 by logging onto DCCN server 810.

Figure 9:
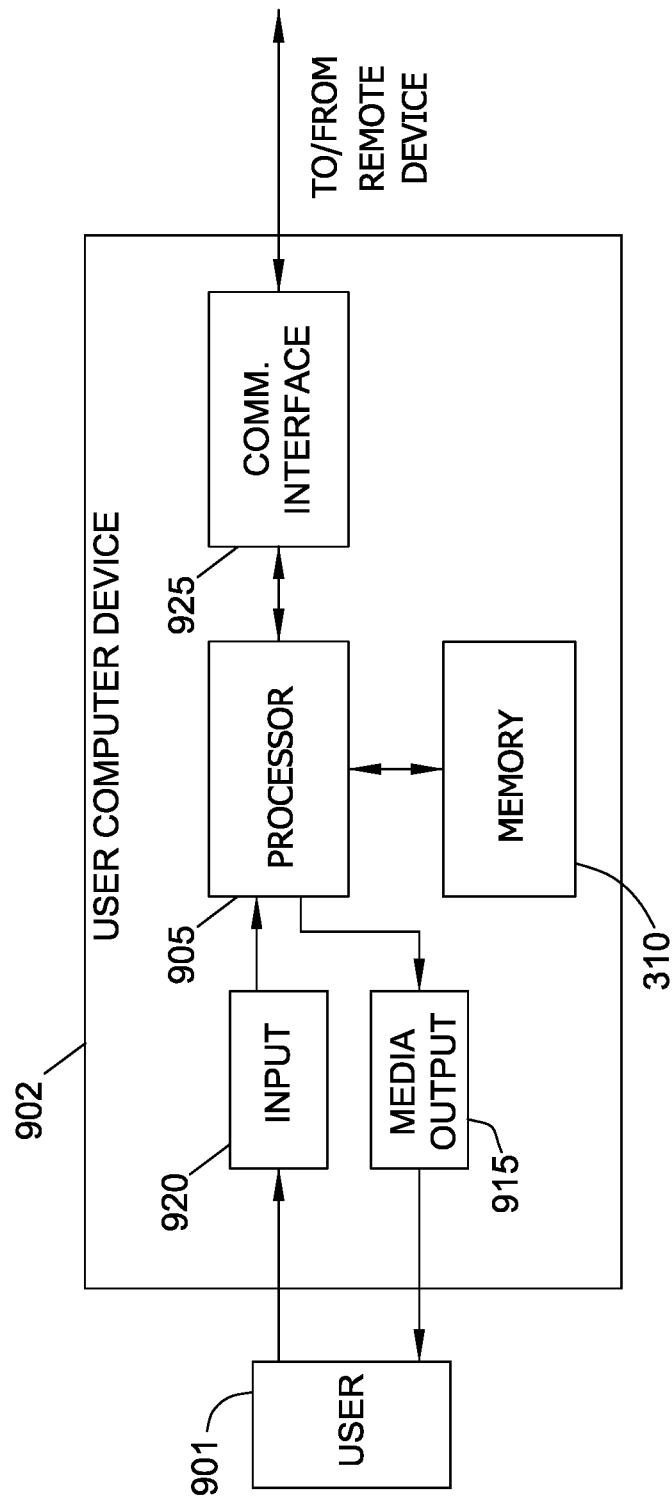
FIG. 9 illustrates an example configuration of a client computer device shown in FIG. 8, in accordance with one embodiment of the present disclosure.

FIG. 9 illustrates an example configuration of client system 825 (shown in FIG. 8), in accordance with one embodiment of the present disclosure. User computer device 902 is operated by a user 901. The user computer device 902 may include, but is not limited to, sensors 805, DCCN computing device 810, and the client systems 825 (all shown in FIG. 8). The user computer device 902 includes a processor 905 for executing instructions. In some embodiments, executable instructions are stored in a memory area 910. The processor 905 may include one or more processing units (e.g., in a multi-core configuration). The memory area 910 is any device allowing information such as executable instructions and/or transaction data to be stored and retrieved. The memory area 910 may include one or more computer-readable media.

The user computer device 902 also includes at least one media output component 915 for presenting information to the user 901. The media output component 915 is any component capable of conveying information to the user 901. In some embodiments, the media output component 915 includes an output adapter (not shown) such as a video adapter and/or an audio adapter. An output adapter is operatively coupled to the processor 905 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, the media output component 915 is configured to present a graphical user interface (e.g., a web browser and/or a client application) to the user 901. A graphical user interface may include, for example, an interface for viewing one or more objects of interest associated with one or more images. In some embodiments, the user computer device 902 includes an input device 920 for receiving input from the user 901. The user 901 may use the input device 920 to, without limitation, select an object to analyze and/or track. The input device 920 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of the media output component 915 and the input device 920.

The user computer device 902 may also include a communication interface 925, communicatively coupled to a remote device such as the DCCN server 810. The communication interface 925 may include, for example, a wired or wireless network adapter and/or a wireless data transceiver for use with a mobile telecommunications network.

Stored in the memory area 910 are, for example, computer-readable instructions for providing a user interface to the user 901 via the media output component 915 and, optionally, receiving and processing input from the input device 920. A user interface may include, among other possibilities, a web browser and/or a client application. Web browsers enable users, such as the user 901, to display and interact with media and other information typically embedded on a web page or a website from the DCCN server 810. A client application allows the user 901 to interact with, for example, the DCCN server 810. For example, instructions may be stored by a cloud service, and the output of the execution of the instructions sent to the media output component 915.

The processor 905 executes computer-executable instructions for implementing aspects of the disclosure. In some embodiments, the processor 905 is transformed into a special purpose microprocessor by executing computer-executable instructions or by otherwise being programmed.

Figure 10:
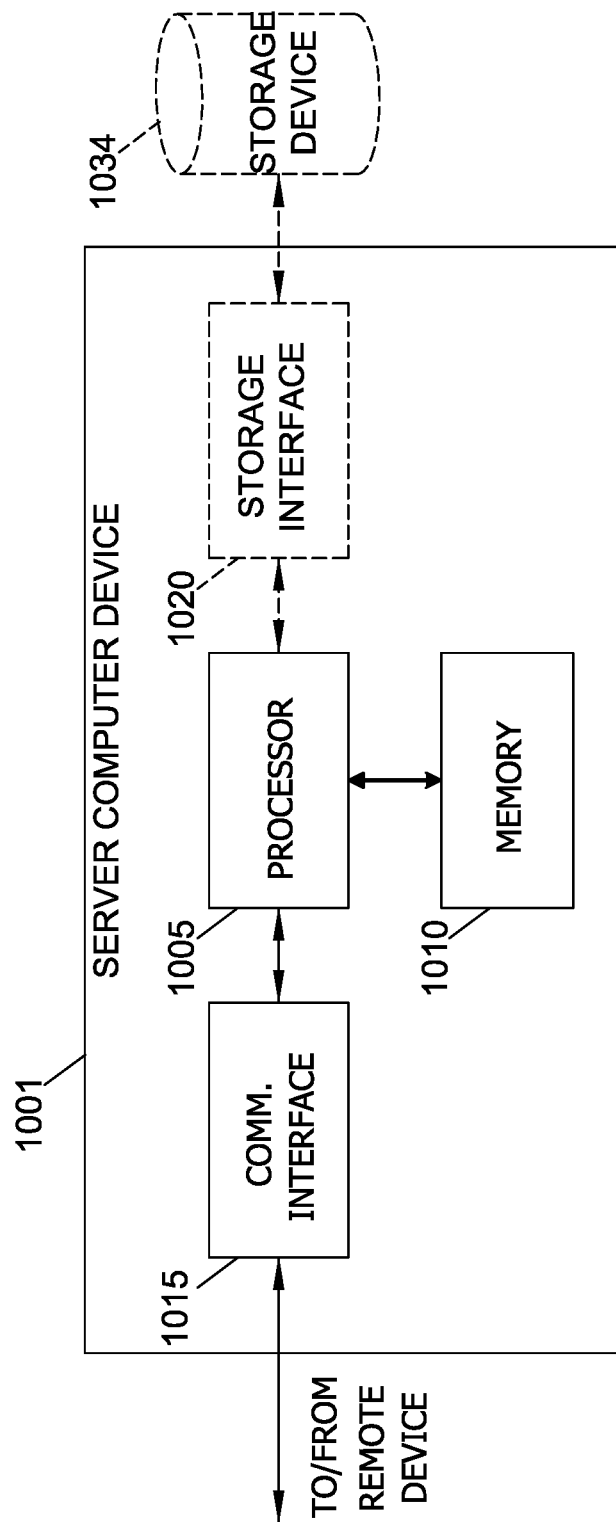
FIG. 10 illustrates an example configuration of the server system shown in FIG. 8, in accordance with one embodiment of the present disclosure.

FIG. 10 illustrates an example configuration of server system, in accordance with one embodiment of the present disclosure. Server computer device 1001 may include, but is not limited to, the database server 815 and the DCCN server 810 (both shown in FIG. 8). The server computer device 1001 also includes a processor 1005 for executing instructions. Instructions may be stored in a memory area 1010. The processor 1005 may include one or more processing units (e.g., in a multi-core configuration).

The processor 1005 is operatively coupled to a communication interface 1015 such that the server computer device 1001 is capable of communicating with a remote device such as another server computer device 1001, another DCCN server 810, one or more sensors 805, or one or more client system 825 (both shown in FIG. 8). For example, the communication interface 1015 may receive requests from the client system 825 via the Internet, as illustrated in FIG. 8.

The processor 1005 may also be operatively coupled to a storage device 1034. The storage device 1034 is any computer-operated hardware suitable for storing and/or retrieving data, such as, but not limited to, data associated with the database 820 (shown in FIG. 8). In some embodiments, the storage device 1034 is integrated in the server computer device 1001. For example, the server computer device 1001 may include one or more hard disk drives as the storage device 1034. In other embodiments, the storage device 1034 is external to the server computer device 1001 and may be accessed by a plurality of server computer devices 1001. For example, the storage device 1034 may include a storage area network (SAN), a network attached storage (NAS) system, and/or multiple storage units such as hard disks and/or solid state disks in a redundant array of inexpensive disks (RAID) configuration.

In some embodiments, the processor 1005 is operatively coupled to the storage device 1034 via a storage interface 1020. The storage interface 1020 is any component capable of providing the processor 1005 with access to the storage device 1034. The storage interface 1020 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1005 with access to the storage device 1034.

The processor 1005 executes computer-executable instructions for implementing aspects of the disclosure. In some embodiments, the processor 1005 is transformed into a special purpose microprocessor by executing computer-executable instructions or by otherwise being programmed. For example, the processor 1005 is programmed with instructions, such as those shown in FIG. 1.

At least one of the technical solutions provided by this system to address technical problems may include: (i) improved analysis of images; (ii) reduces back propagation; (iii) reduced need for supervised learning; (iv) improved speed of analysis of images; (v) more accurate identification; (vi) reduced need for processing power; (vii) improved tracking of objects over multiple images; and (viii) improved chance of averting a potential incident.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, historical categorizations, and/or actual errors. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing— either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about infrastructures and users associated with a building to detect events and correlations between detected events to identify trends.

Based upon these analyses, the processing element may learn how to identify characteristics and patterns that may then be applied to analyzing image data, model data, and/or other data. For example, the processing element may learn to identify the category and/or one or more errors in an image. The processing element may also learn how to identify rendering errors that may not be readily apparent based upon image data.

The methods and system described herein may be implemented using computer programming or engineering techniques including computer software, firmware, hardware, or any combination or subset. As disclosed above, at least one technical problem with prior systems is that there is a need for systems for a cost-effective and reliable manner for analyzing image data to detect, identify, and track objects of interest in the image. The system and methods described herein address that technical problem. Additionally, at least one of the technical solutions provided by this system to overcome technical problems may include: (i) improved analysis of images; (ii) reduces back propagation; (iii) reduced need for supervised learning; (iv) improved speed of analysis of images; (v) more accurate identification; (vi) reduced need for processing power; (vii) improved tracking of objects over multiple images; and (viii) improved chance of averting a potential incident.

The methods and systems described herein may be implemented using computer programming or engineering techniques including computer software, firmware, hardware, or any combination or subset thereof, wherein the technical effects may be achieved by performing at least one of the following steps: (a) receive an image including a plurality of objects; (b) detect the plurality of objects in the image; (c) determine dependencies between each of the plurality of objects; (d) identify the plurality of objects based, at least in part, on the plurality of dependencies; (e) determine one or more objects of interest from the plurality of identified objects; (f) analyze the image in real-time; (g) determine a relative position for each object of the plurality of objects; (h) generate an identifier for each of the plurality of objects in the image; (i) identify each object based on the plurality of dependencies and the corresponding identifier; (j) generate the identifier based on a plurality of attributes of the corresponding object; (k) store a plurality of known object identifiers, wherein each known object identifiers represents a known object; (l) compare the plurality of known object identifiers to the identifiers of the plurality of objects to identify the plurality of objects, wherein the plurality of known object identifiers are categorized by context; (m) determine a context associated with an object based at least in part on linked objects; (n) compare the plurality of known object identifiers associated with the context with the object to be identified; (o) identify a depth associated with each object of the plurality of objects in the image; (p) determine a relative position for each object of the plurality of objects based on a current position in the image and the depth associated with the object; (q) determine dependencies between each of the plurality of objects based on the relative positions associated with each object; (r) store a plurality of historical images associated with the image; (s) determine a velocity of an object of the plurality of objects based on a current position of the object in the image and a plurality of past positions of the object in one or more of the plurality of historical images; (t) populate an input layer of a neural network with the plurality of objects; (u) apply the plurality of objects to a convoluted neural network without creating a fully connected layer; (v) determine an identity associated with the face based on the plurality of identified objects; (w) determine a temperature associated with the face based on the temperature sensor; (x) determine whether or not to deny access based on the temperature and the identity; (y) determine if the temperature is in an allowed range based on historical data for a person associated with the identity; (z) determine if the face is wearing proper safety equipment based on the plurality of identified objects; (aa) determine if the proper safety equipment is properly being worn based on the plurality of identified objects; and (bb) identify a subset of the plurality of identified objects as background objects based on at least one of proximity to other objects and historical movement.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
    a computing device comprising at least one processor in communication with at least one memory device, wherein the at least one processor is programmed to:
    receive an image including a plurality of objects;
    detect the plurality of objects in the image;
    determine one or more dependencies between each object of the plurality of objects, where each object of the plurality of objects is connected to each object in the plurality of objects through the one or more dependencies;
    determine one or more objects of interest from the plurality of objects;
    associate the one or more objects of interest within the image with observed values, the observed values based on actual data; and
    associate objects of the plurality of objects within the image other than the one or more objects of interest with concept values of a concept net, the concept values based on stored data.

2. The system of claim 1, wherein the at least one processor is further programmed to identify the plurality of objects based, at least in part, on the one or more dependencies.

3. The system of claim 1, wherein the at least one processor is further programmed to classify an object of the plurality of objects as an object of interest based on at least one of proximity to other objects and historical movement.

4. The system of claim 1, wherein the at least one processor is further programmed to classify an object of the plurality of objects as an object of interest based on a context of the object.

5. The system of claim 1, wherein the at least one processor is further programmed to:
    filter a plurality of background objects from the plurality of objects; and
    determine one or more objects of interest from the remaining plurality of objects.

6. The system of claim 5, wherein the at least one processor is further programmed to classify an object of the plurality of objects as a background object based on at least one of proximity to other objects and historical movement.

7. The system of claim 5, wherein the at least one processor is further programmed to classify an object of the plurality of objects as a background object based on a context of the object.

8. The system of claim 1, wherein the at least one processor is further programmed to identify the plurality of objects based, at least in part, on the one or more dependencies and whether the object is classified as a background object.

9. The system of claim 1, wherein the image is a first image, and wherein the at least one processor is further programmed to:
    classify a first object of the plurality of objects in the first image as a background object;
    classify a second object of the plurality of objects in the first image as an object of interest;
    receive a second image at a subsequent point in time; and
    classify the object of interest in the second image based on a relationship with the second object.

10. The system of claim 1, further comprising a sensor for capturing an image, and wherein the sensor is programmed to transmit the image in real-time or near real-time.

11. The system of claim 1, wherein the at least one processor is further programmed to determine a relative position for each object of the plurality of objects.

12. The system of claim 11, wherein the at least one processor is further programmed to:
    generate an identifier for each of the plurality of objects in the image; and
    identify each object based on the one or more dependencies and the corresponding identifier.

13. The system of claim 12, wherein the at least one processor is further programmed to generate the identifier based on a plurality of attributes of the corresponding object.

14. The system of claim 13, wherein the at least one processor is further programmed to:
    store a plurality of known object identifiers, wherein each of the known object identifiers represents a known object; and
    compare the plurality of known object identifiers to the identifiers of the plurality of objects to identify the plurality of objects.

15. The system of claim 14, wherein the plurality of known object identifiers are categorized by context, and wherein the at least one processor is further programmed to:

determine a context associated with an object based at least in part on linked objects; and compare the plurality of known object identifiers associated with the context with the object to be identified.

16. The system of claim 15, wherein the at least one processor is further programmed to classify an object as a background object based on the object's identifier.

17. The system of claim 1, wherein the at least one processor is further programmed to:

store a plurality of historical images associated with the image; and determine a movement and speed of an object of the plurality of objects based on a current position of the object in the image and a plurality of past positions of the object in one or more of the plurality of historical images.

18. The system of claim 13, wherein the at least one processor is further programmed to determine whether to classify the object as an object of interest based on the movement and speed of the object.

19. A method for real-time image analysis, the method implemented by a computer device comprising at least one processor in communication with at least one memory device, wherein the method comprises:

receiving an image including a plurality of objects;

detecting the plurality of objects in the image;

determining one or more dependencies between each object of the plurality of objects, wherein each object of the plurality of objects is connected to each object in the plurality of objects through the one or more dependencies;

determining one or more objects of interest of the plurality of objects;

associate the one or more objects of interest within the image with observed values, the observed values based on actual data; and associate objects of the plurality of objects within the image other than the one or more objects of interest with concept values of a concept net, the concept values based on stored data.

20. The method of claim 19, further comprising classifying an object of the plurality of objects as an object of interest based on at least one of proximity to other objects, historical movement, and a context of the object.

* * * * *